(12) United States Patent
Pan (10) Patent No.: US 12,481,652 B1
(45) Date of Patent: Nov. 25, 2025

(54) CONTEXTUAL IDENTIFIER-ATTRIBUTE MAPPINGS FOR LARGE LANGUAGE MODELS

(71) Applicant: Palo Alto Networks, Inc., Santa Clara, CA (US)

(72) Inventor: Chenghung James Pan, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/932,150

(22) Filed: Oct. 30, 2024

(51) Int. Cl.
  *G06F 16/2452* (2019.01)
  *G06F 16/242* (2019.01)
  *G06F 40/186* (2020.01)
  *G06F 40/284* (2020.01)
  *G06F 40/40* (2020.01)

(52) U.S. Cl.
  CPC ........ *G06F 16/2452* (2019.01); *G06F 16/243* (2019.01); *G06F 40/186* (2020.01); *G06F 40/284* (2020.01); *G06F 40/40* (2020.01)

(58) Field of Classification Search
  CPC .. G06F 16/2452; G06F 16/243; G06F 40/284; G06F 40/40; G06F 40/186
  USPC ........................................................ 707/763
  See application file for complete search history.

(56) References Cited

U.S. PATENT DOCUMENTS

| | | | | |
|---|---|---|---|---|
| 10,817,527 | B1 * | 10/2020 | Setlur | G06F 16/243 |
| 11,960,500 | B1 * | 4/2024 | Sboychakova | G06F 40/20 |
| 12,197,452 | B1 * | 1/2025 | Merchant | G06F 16/243 |
| 12,217,029 | B1 * | 2/2025 | Andre | G06F 8/35 |
| 2018/0349343 | A1 * | 12/2018 | Bull | G06F 16/243 |
| 2019/0043483 | A1 * | 2/2019 | Chakraborty | G10L 15/063 |
| 2019/0180258 | A1 * | 6/2019 | Amar | H04L 51/02 |
| 2019/0325498 | A1 * | 10/2019 | Clark | G06Q 30/0643 |
| 2020/0142888 | A1 * | 5/2020 | Alakuijala | G06F 16/242 |
| 2022/0318860 | A1 * | 10/2022 | Dorch | G10L 15/28 |

(Continued)

OTHER PUBLICATIONS

Quamar, Abdul et al., "Natural Language Interfaces to Data", Foundations and Trends in Databases: vol. 11, No. 4 , Dec. 26, 2022 (Dec. 26, 2022), pp. 319-414, DOI: 10.1561/1900000078.*

(Continued)

*Primary Examiner* — Cam Linh T Nguyen (74) *Attorney, Agent, or Firm* — Gilliam IP PLLC (57) ABSTRACT

A contextual natural language query response system (contextual system) leverages contextual attribute-identifier mappings to improve large language model (LLM) responses to natural language queries. The contextual system replaces identifiers in natural language queries with attributes according to a contextual mapping table between identifiers and attributes to generate attribute-based natural language queries. The contextual system then uses retrieval-augmented generation with the attributes-based natural language queries to prompt an LLM to generate attribute-based database queries. The contextual system uses the mappings from the contextual mapping table to convert the attribute-based database queries to identifier-based database queries and queries a database with the identifier-based database queries. The contextual system responses to the natural language queries using results from querying the database.

20 Claims, 7 Drawing Sheets

(56) References Cited

U.S. PATENT DOCUMENTS

| | | | | |
|---|---|---|---|---|
| 2023/0078177 | A1* | 3/2023 | Wang | G06F 16/243 707/760 |
| 2023/0281230 | A1* | 9/2023 | Kukla | G06F 16/93 707/722 |
| 2024/0126795 | A1* | 4/2024 | Zhong | H04L 51/02 |
| 2024/0202461 | A1* | 6/2024 | Pagnoni | G06F 16/345 |
| 2024/0289407 | A1* | 8/2024 | Rofouei | G06F 16/9577 |
| 2024/0296295 | A1* | 9/2024 | Russell | G06F 40/56 |
| 2024/0311546 | A1* | 9/2024 | Maschmeyer | G06F 40/166 |
| 2024/0354436 | A1* | 10/2024 | Mukherjee | G06F 16/3344 |
| 2024/0354710 | A1* | 10/2024 | Logiotatidis | G06F 40/205 |
| 2024/0411813 | A1* | 12/2024 | Yim | G06F 40/30 |
| 2025/0068627 | A1* | 2/2025 | Hoang | G06F 16/24573 |

OTHER PUBLICATIONS

Barron, et al., "Domain-Specific Retrieval-Augmented Generation Using Vector Stores, Knowledge Graphs, and Tensor Factorization", arXiv: 2410.02721v1 [cs.CL] Oct. 3, 2024, 8 pages.

Cui, et al., "LLMind: Orchestrating AI and IoT with LLM for Complex Task Execution", arXiv:2312.09007v4 [cs.IT] Aug. 9, 2024, 7 pages.

Das, et al., "Security and Privacy Challenges of Large Language Models: A Survey", arXiv:2402.00888v2 [cs.CL] Nov. 14, 2024, 51 pages.

Embley, et al., "Mapping Conceptual Models to Database Schemas", Handbook of Conceptual Modeling: Theory, Practice, and Research Challenges, Mar. 13, 2011, 44 pages.

Freitas, "Schema-Agnostic Queries for Large-Schema Databases: A Distributional Semantics Approach", National University of Ireland, Galway Doctoral Thesis [online], retrieved from the Internet Dec. 20, 2024 from <https://researchrepository.universityofgalway.ie/bitstream/handle/10379/5540/thesis_schema_agnostic.pdf?sequence=1>, May 2015, 398 pages.

Gao, et al., "Retrieval-Augmented Generation for Large Language Models: A Survey", arXiv:2312.10997v5 [cs.CL] Mar. 27, 2024, 21 pages.

Keddhar, "Transformers and Large Language Models for Efficient Intrusion Detection Systems: A Comprehensive Survey", arXiv:2408.07583v1 [cs.CR] Aug. 14, 2024, 34 pages.

Li, et al., "Enhancing LLM Factual Accuracy with RAG to Counter Hallucinations: A Case Study on Domain-Specific Queries in Private Knowledge-Bases", arXiv:2403.10446v1 [cs.CL] Mar. 15, 2024, 10 pages.

Mandal, et al., "Effectiveness of Transformer Models on IoT Security Detection in StackOverflow Discussions", arXiv:2207.14542v1 [cs.CR] Jul. 29, 2022, 12 pages.

Meyuhas, et al., "IoT Device Labeling Using Large Language Models", arXiv:2403.01586v1 [cs.CR] Mar. 3, 2024, 11 pages.

Mohammadi, et al., "Deep Learning for IoT Big Data and Streaming Analytics: A Survey", arXiv:1712.04301v2 [cs.NI] Jun. 5, 2018, 40 pages.

Rudniy, et al., "Mapping biological entities using the longest approximately common prefix method", BMC Bioinformatics vol. 15, No. 1,87, Jun. 14, 2014, 10 pages, doi: 10.1186/1471-2105-15-187.

Xiao, et al., "Efficient Prompting for LLM-based Generative Internet of Things", IEEE Internet of Things Journal, vol. 12, No. 1, Jan. 1, 2025, pp. 778-791, doi: 10.1109/JIOT.2024.3470210, Oct. 2024.

* cited by examiner

CONTEXTUAL IDENTIFIER-ATTRIBUTE MAPPINGS FOR LARGE LANGUAGE MODELS

BACKGROUND

The disclosure generally relates to data processing (e.g., CPC subclass G06F) and to computing arrangements based on specific computational models (e.g., CPC subclass G06N).

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model, and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large language models (LLMs) are based on the Transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning. For instance, a pre-trained language model can be fine-tuned on a training dataset of examples that pair prompts and responses/predictions. Prompt-tuning and prompt engineering of language models have also been introduced as lightweight alternatives to fine-tuning. Prompt engineering can be leveraged when a smaller dataset is available for tailoring a language model to a particular task (e.g., via few-shot prompting) or when limited computing resources are available. In prompt engineering, additional context may be fed to the language model in prompts that guide the language model as to the desired outputs for the task without retraining the entire language model or changing the weights of the language model.

Applications that use foundation models have combined the use of a foundation model with retrieval augmented generation (RAG). RAG augments a query/prompt with context, in the form of embeddings, from an authoritative data source external to the foundation model. This separation allows for the authoritative data source to be more efficiently updated than updating knowledge of the foundation model and facilitates dynamic augmentation of a prompt with current context for a domain(s) represented by the authoritative data source. The RAG technique generates an embedding(s) from the prompt and retrieves similar embeddings from the authoritative data source. With the prompt and similar embeddings, the foundation model generates a retrieval augmented output that has been shown to be more accurate and context-relevant than without RAG.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

LLMs and other language models trained on general natural language tasks, while having large breadth of knowledge due to training on large and diverse datasets, often lack domain-specific knowledge for more specialized tasks. These LLMs often confuse domain-specific terminology due to broader interpretations of terms across domains. Moreover, identifying entities in text for a specific domain presents challenges due to those entities having compound identifiers. For instance, in the domain of querying database for Internet of Things (IoT) devices, a compound identifier such as "apple watch" corresponds to a profile entity, whereas the prefix of this identifier, "apple", corresponds to a vendor entity. This leads LLMs to output incorrect entities when generating database queries or otherwise responding to user queries. By contrast, using attributes such as profile and vendor, which refer to a category or classification of an entity, can yield more fruitful results than using the original entity identifiers.

The present disclosure proposes a framework for replacing identifiers in natural language queries with placeholder attributes prior to prompting an LLM, then inserting the original identifiers in place of the attributes in the LLM's output. An identifier-attribute replacer receives an identifier-based natural language query and replaces identifiers with attributes according to a mapping table between identifiers and attributes to generate an attribute-based natural language query. A prompt generator retrieves example natural language query/database query pairs having natural language queries similar to the attribute-based natural language query using RAG and populates a prompt template with the attribute-based natural language query and the examples to generate a prompt. The prompt generator prompts the LLM with the prompt to generate an attribute-based database query. The identifier-attribute replacer then replaces attributes with corresponding identifiers according to the previous mapping to generate an identifier-based database query. The identifier-attribute replacer then retrieves entities relevant to the original identifier-based natural language query from a database using the identifier-based database query and generates a response based on the retrieved entities. The use of identifier-attribute mappings increases accuracy of LLMs for context-specific applications and is scalable and adaptable across domains merely by replacing/updating the knowledge base and mapping table. Moreover, the resulting system can be implemented across various technology sectors having a same context with little to no additional setup.

Example Illustrations

Figure 1:
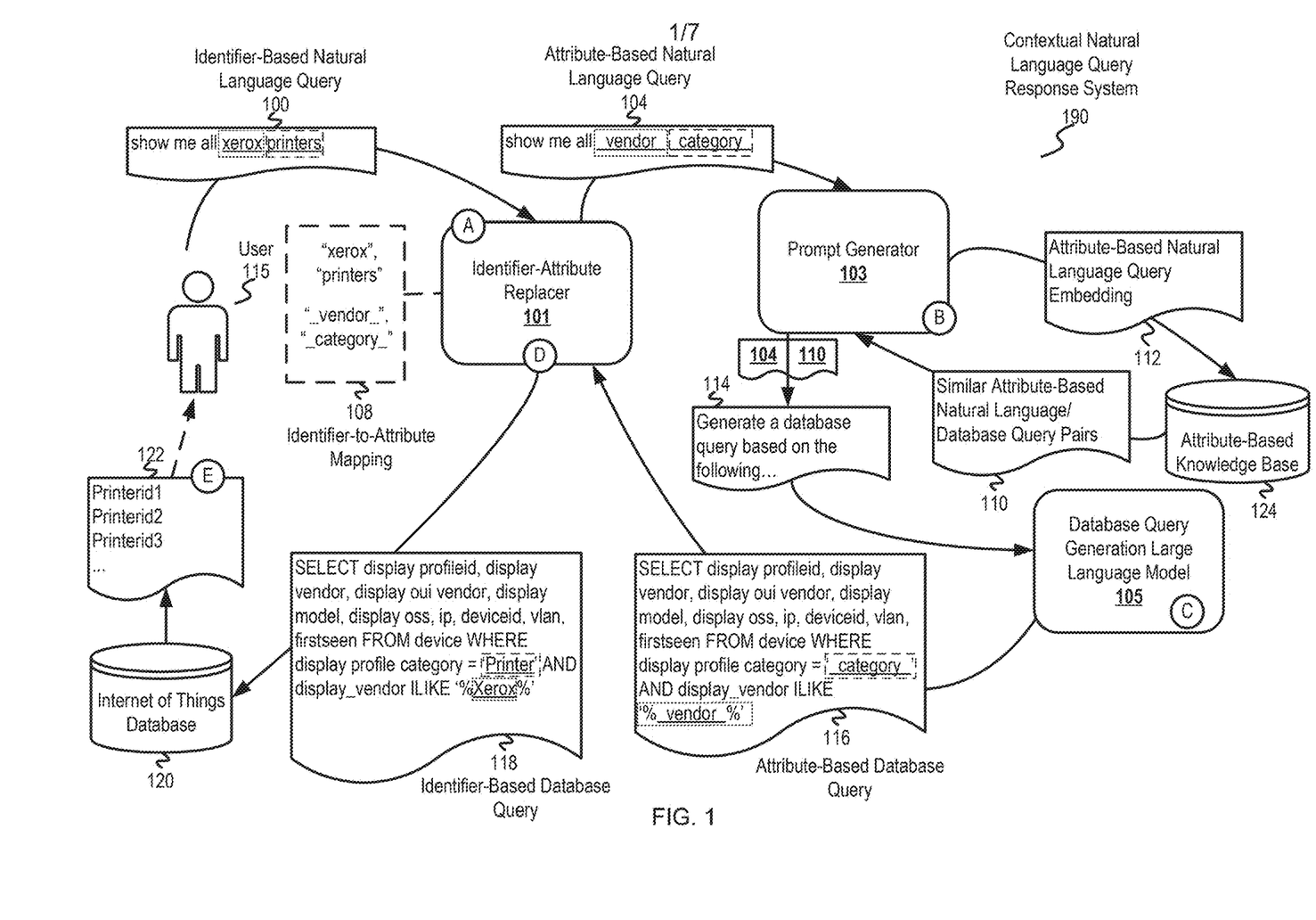
FIG. 1 is a schematic diagram of an example system for responding to natural language queries for data from an Internet of Things (IoT) database using contextual identifier-attribute mappings and an LLM.

FIG. 1 is a schematic diagram of an example system for responding to natural language queries for data from an IoT database using contextual identifier-attribute mappings and a large language model. A contextual natural language query response system 190 comprises an identifier-attribute replacer 101, a prompt generator 103, a database query generation LLM ("query LLM") 105, an attribute-based knowledge base 124, and an IoT database 120. The identifier-attribute replacer 101 replaces identifiers in natural language queries with attributes using stored mapping tables that map each IoT attribute to one or more IoT identifiers. The stored mapping tables are predefined according to domain-level knowledge (e.g., populated by an expert). The prompt generator 103 receives attribute-based natural language queries and retrieves similar attribute-based natural language query/database query pairs from the attribute-based knowledge base 124 via RAG. The prompt generator 103 then generates prompts for the query LLM 105 using the attribute-based natural language queries and the query pairs and prompts the query LLM 105 with the generated prompts to obtain attribute-based database queries. The identifier-attribute replacer 101 replaces attributes in the attribute-based database queries according to the original mappings used for identifier-attribute replacement to generate identifier-based database queries and queries the IoT database 120 with the identifier-based database queries. Responses from querying the IoT database 120 are then used to respond to the original, identifier-based natural language queries.

FIG. 1 is annotated with a series of letters A-E. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the identifier-attribute replacer 101 receives an identifier-based natural language query 100 from a user 115 and converts the identifier-based natural language query 100 to an attribute-based natural language query 104. The identifier-based natural language query 100 comprises the text "show me all xerox printers", wherein the entities "xerox" and "printers" are referred to according to their identifiers. The attribute-based natural language query 104 comprises the text "show me all vendor category_" that is replaced with the "xerox" identifier with the "vendor" attribute and the "printers" identifier with the "category" attribute. The identifier-attribute replacer 101 uses stored mapping tables to determine an identifier-to-attribute mapping 108 that maps each identifier in the identifier-based natural language query 100 to a corresponding attribute in the attribute-based natural language query 104. The identifier-attribute mapping 108 associates the identifier "xerox" with attribute "_vendor" and the identifier "printers" with attribute "_category_". The identifier-attribute replacer 101 stores the identifier-to-attribute mapping 108 (e.g., in cache memory) to later replace the attributes with identifiers in a database query prior to querying the IoT database 120.

The identifier-attribute replacer 101 comprises both an identifier-attribute mapping table and a prefix-attribute mapping table. The identifier-attribute mapping table comprises a map between each supported identifier and its corresponding attribute (wherein each attribute may be mapped to multiple identifiers), and the prefix-attribute mapping table comprises a map between prefixes of identifiers, i.e., prefix sets of tokens of multi-token identifiers, and corresponding attributes. When identifying/extracting and replacing identifiers in identifier-based natural language queries with attributes, an identifier may have prefixes that are themselves identifiers. As such, the identifier-attribute replacer 101 determines longest prefixes of tokens that match identifiers using both the identifier-attribute mapping table and the prefix-attribute mapping table during replacement. This is illustrated in greater detail in FIG. 2, and the operations are described in greater detail in reference to FIG. 5.

At stage B, the prompt generator 103 retrieves similar attribute-based natural language and database query pairs 110 having similar natural language queries to the query 104 from the attribute-based knowledge base 124 using RAG. The prompt generator 103 then populates an example prompt template 114 with the query 104 and the query pairs 110 to generate a prompt for the query LLM 105. For RAG, the prompt generator 103 generates an embedding 112 of the attribute-based natural language query 104 (e.g., using word2vec or other natural language processing (NLP) embeddings) and queries the attribute-based knowledge base 124 with the embedding 112 to retrieve the query pairs 110. The attribute-based knowledge base 124 can comprise a vector database for efficient retrieval of query pairs having similar natural language query embeddings to the embedding 112 (referred to as an embedding for simplicity, although the embedding 112 can additionally comprise query parameters formatted according to a query schema of the attribute-based knowledge base 124). The embedding 112 can additionally indicate settings such as number of similar queries to return (e.g., top 10 most similar queries), maximum threshold embedding distance for returned queries, etc. In other examples, the attribute-based knowledge base 124 can be configured to return query pairs according to these settings.

The example prompt template 114 comprises the text (truncated in FIG. 1 for space, wherein the query 104 is inserted into the "<identifier-based natural language query>" field and the query pairs 110 are inserted into the "<examples>" field):

Generate a database query based on the following natural language query:
<attribute-based natural language query>
Use the following natural language query/database query pairs as example inputs and corresponding outputs for guidance:
<example>

The example prompt template 114 can additionally specify schema for or otherwise identify/describe a query language of the IoT database 120, specify records in the IoT database 120, specify formats of inputs/outputs, etc. Moreover, the example prompt template 114 can comprise instructions to act as an expert in a domain of the identifiers/attributes (IoT devices in the example in FIG. 1).

The attribute-based knowledge base 124 was previously populated with example attribute-based query pairs and corresponding embeddings. For instance, a domain-level expert can detect identifier-based natural language queries previously provided by users and corresponding identifier-based database queries used to respond to those users that are known to be correct (e.g., according to user feedback). The identifier-attribute replacer 101 can replace identifiers with attributes in each of the query pairs and can populate the attribute-based knowledge base 124 with the attribute-based query pairs.

At stage C, the prompt generator 103 prompts the query LLM 105 with the prompt template 114 populated with the queries 104 and the query pairs 110 to generate an attribute-based database query 116 as output. The attribute-based database query 116 comprises the following Structured Query Language (SQL) query:

SELECT display profileid, display vendor, display oui vendor, display model, display oss, ip, deviceid, vlan, firstseen FROM device WHERE display profile category='_category_' AND display_vendor ILIKE '%_vendor_%'

The attribute-based database query 116 comprises the attributes "_category_" and "%_vendor_%" that replaced corresponding identifiers "printers" and "xerox" in the attribute-based natural language query 104. The query LLM 105 can comprise an open-source LLM (e.g., the OpenAIR GPT-4® LLM) or other type of foundation model (e.g., transformer neural network) that is prompt-tuned and/or fine-tuned for the task of generating database queries based on natural language queries. The prompt template 114 and/or training/configuration of the query LLM 105 may or may not indicate that attributes for the domain of interest (IoT) are used instead of identifiers. For instance, the prompt template 114 may comprise instructions that the natural language query is provided with attributes instead of identifiers, the query LLM 105 may be prompt-tuned on examples having attributes instead of identifiers, etc.

At stage D, the identifier-attribute replacer 101 replaces attributes in the attribute-based database query 116 with corresponding identifiers to generate identifier-based database query 118. Because each attribute may map to multiple identifiers (e.g., multiple device categories, multiple device vendors, etc.), the identifier-attribute replacer 101 uses the identifier-to-attribute mapping 108 to determine which identifier to which each attribute maps. The identifier-based database query 118 comprises the SQL query (wherein the "xerox" and "printers" identifiers have been updated with standardized identifiers "Printer" and "Xerox"):

SELECT display profileid, display vendor, display oui vendor, display model, display oss, ip, deviceid, vlan, firstseen FROM device WHERE display profile category='Printer' AND display_vendor ILIKE '% Xerox %'

In some embodiments, the identifier-attribute replacer 101 (or other validation component) can determine whether the identifier-based database query 118 is correct, i.e., has valid syntax for the query language of the IoT database 120 and has the requested functionality in the identifier-based natural language query 100. When the identifier-based database query 118 is incorrect, the prompt generator 103 can prompt the query LLM 105 with the same prompt (i.e., the prompt template 114 populated with the query 104 and the query pairs 110) to generate additional attribute-based database queries that are converter to identifier-based database queries and subsequently evaluated for correctness. This leverages the temperature/randomness of the query LLM 105 to attempt to generate different database queries over multiple iterations with the same prompt.

At stage E, the identifier-attribute replacer 101 queries the IoT database 120 with the identifier-based database query 118 to obtain results 122 and uses the results 122 to respond to the user 115. The results 122 comprise the printers "Printerid1", "Printerid2", and "Printerid3" that are the Xerox® printers associated with the user 115. The identifier-attribute replacer 101 can populate a response template with the results 122 and/or query an LLM with the results 122 and instructions to respond to the identifier-based natural language query 100 using the results 122 and provide the response generated by the LLM to the user 115.

The natural language query-to-database query conversion depicted in FIG. 1 is for a database using SQL as a query language. Other types of databases having other types of query languages (e.g., data definition language, data manipulation language, etc.) are additionally anticipated. The contextual natural language query response system 190 is easily adaptable to different database types/query languages, for instance by updating the prompt template 114 to include instructions indicating the type and schema of the other query languages, by choosing the query LLM 105 as an LLM adapted, trained, or otherwise configured for a particular query language(s), etc. Moreover, the contextual natural language query response system 190 is easily transferrable across identifier/attribute contexts simply by updating mapping tables used by the identifier-attribute replacer 101 to a particular context and/or as new identifiers/attribute pairs are detected/determined within a context (e.g., as new device types are onboarded to the IoT for an organization). The identifier-attribute mappings can be detected by machine learning models that learn these mappings based on user interactions. For instance, the machine learning models can comprise classifiers (e.g., neural network classifiers, support vector machines, etc.) trained to identify/detect entities in user queries, and newly identified/detected entities by the machine learning models (i.e., entities not already present in the mappings) can be assigned attributes by a domain-level expert.

Figure 2:
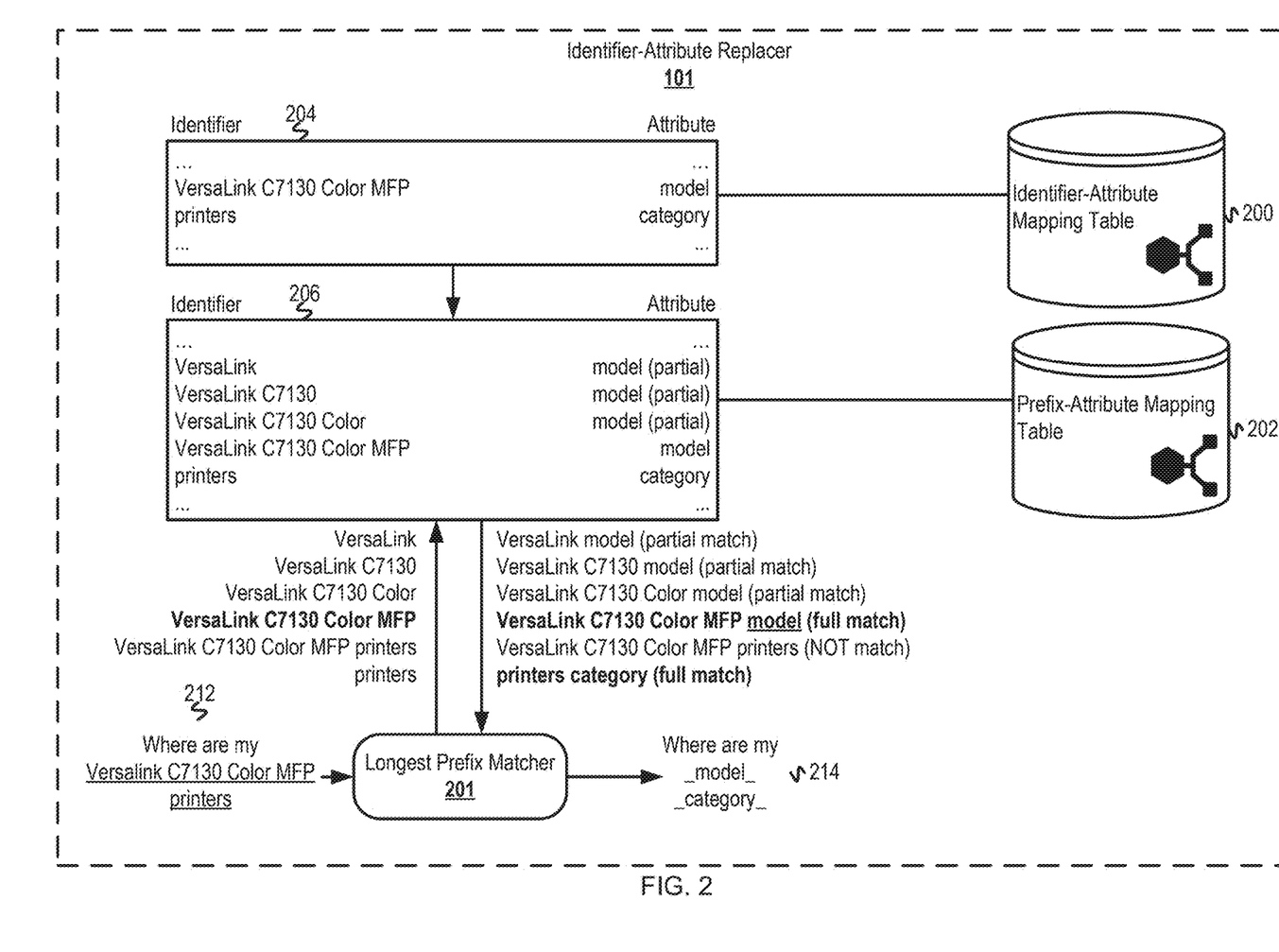
FIG. 2 is a schematic diagram of mapping tables for identifier-attribute replacement in natural language queries and database queries.

FIG. 2 is a schematic diagram of mapping tables for identifier-attribute replacement in natural language queries and database queries. The identifier-attribute replacer 101 depicted above in reference to FIG. 1 comprises an identifier-attribute mapping table 200 and a prefix-attribute mapping table 202 that also includes prefix token sets for multi-token identifiers in the identifier-attribute mapping table 200. The identifier-attribute replacer 101 also includes a longest prefix matcher 201 that searches for identifiers and identifier prefixes in natural language queries and replaces them with attributes according to the identifier-attribute mapping table 200.

In the example depicted in FIG. 2, the longest prefix matcher 201 receives natural language query 212 comprising the text "Where are my Veralink C7130 Color MFP printers". The longest prefix matcher 201 begins scanning the text of the natural language query 212 from left to right to determine whether a token in the natural language query 212 matches a token for an identifier or identifier prefix stored in the prefix-attribute mapping table 202. The longest prefix matcher 201 performs a lookup for each token from left to right during the scanning and, after unsuccessfully matching the tokens "Where", "are", and "my", matches the token "Versalink" as an identifier that partially matches the model attribute. The longest prefix matcher 201 then begins performing lookups for sets of tokens starting with the "Versalink" token to identify longer prefixes that match identifiers in the prefix-attribute mapping table 202. In the depicted example, the longest prefix matcher 201 makes a match of "Versalink C7130" and "Versalink C7130 Color" with identifiers corresponding to a partial match of the model attribute and then makes a match of the identifier "Versalink C7130 Color MFP" corresponding to a full match with the model attribute. The longest prefix matcher 201 continues looking up successively longer prefixes until no match is determined; in this instance, "Versalink C7130 Color MFP printers" does not match any prefixes in the prefix-attribute mapping table 202. The longest prefix matcher 201 then takes the longest prefix corresponding to an identifier that fully or partially matches an attribute and replaces that prefix with the corresponding attribute in the natural language query 212. The longest prefix matcher 201 then continues left-to-right scanning starting at the subsequent token to the last token in the prefix match. In this example, the longest prefix matcher 201 scans the token "printers", determines a match with and identifier that fully matches the category attribute, then stops because there are not more tokens in the natural language query 212. The longest prefix matcher 201 then replaces matched identifiers (including prefixes) with corresponding attributes to generate attribute-based natural language query 214 comprising the text "Where are my_model_category_".

During the matching, the longest prefix matcher 201 generates a prefix-attribute mapping 206 comprising all of the matches, including intermediate matches (i.e., "Veralink", "Veralink C7130", and "Veralink C7130 Color"), and an identifier-attribute mapping 204 comprising all of the final matches not including intermediate matches. The identifier-attribute mapping 204 is stored by the identifier-attribute replacer 101 because it will be used when converting an attribute-database query generated from the attribute-based natural language query 214 to an identifier-based database query in subsequent operations. The identifier-attribute mapping 204 is stored for future use because each attribute may map to multiple identifiers.

Figure 3:
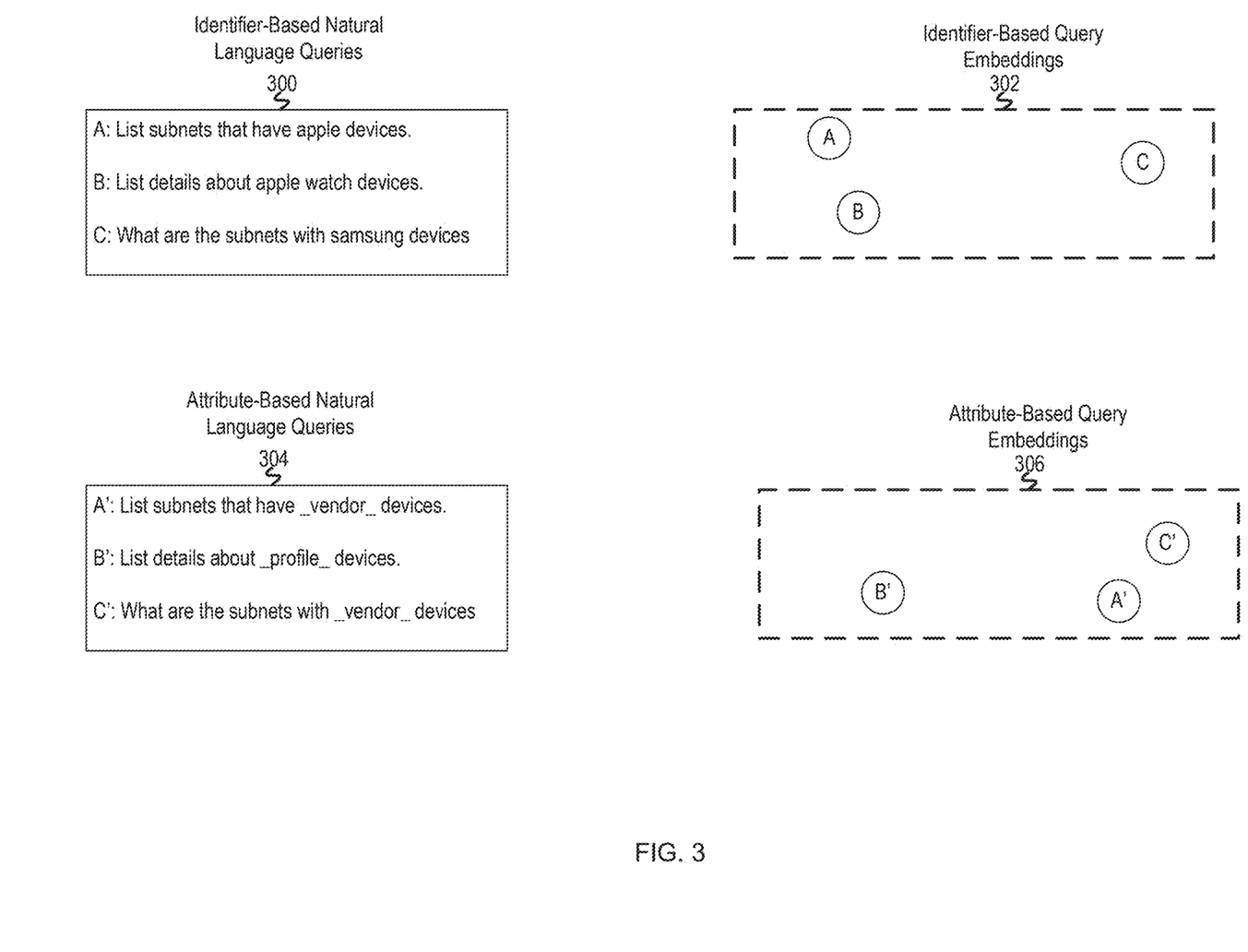
FIG. 3 is an illustrative diagram of example identifier-based natural language queries, example attribute-based natural language queries, and their corresponding embeddings.

FIG. 3 is an illustrative diagram of example identifier-based natural language queries, example attribute-based natural language queries, and their corresponding embeddings. Identifier-based natural language queries 300 comprise the following examples:

A: List subnets that have apple devices.
B: List details about apple watch devices.
C: What are the subnets with samsung devices.

Identifier-based query embeddings 302 illustrate the difficulties with using identifier-based natural language query embeddings for retrieval-augmented generation. Although examples A and B have more similar embeddings than examples A and C, examples A and C have similar functionality when querying a database, i.e., listing subnets of devices for specific vendors. By contrast, example B queries for details about devices with a specific device profile. Retrieving example B as similar to example A may not be a useful example to provide to an LLM.

Attribute-based natural language queries 304 comprise the following examples, where the identifiers in the queries 300 are replaced with attributes:

A': List subnets that have _vendor_devices.
B': List details about _profile_devices.
C': What are the subnets with _vendor_devices.

As illustrated by attribute-based query embeddings 306, examples A' and C' have similar embeddings that are both dissimilar to the embedding of example B'. This is reflective of the respective functionalities for requests by each query.

FIGS. 1-3 are depicted in the context of using identifier-attribute mappings for identifiers/attributes of entities that are IoT devices. The remaining Figures describe using identifier-attributes mappings for identifiers of generic entities. The attribute for each identifier can be obtained, for instance, using named-entity recognition or can be codified according to a mapping table by a domain-level expert within a corresponding entity context. For instance, the entities can comprise firewalls and corresponding security policies deployed across an organization, with entity attributes comprising firewall models, security policy types, etc.

Figure 4:
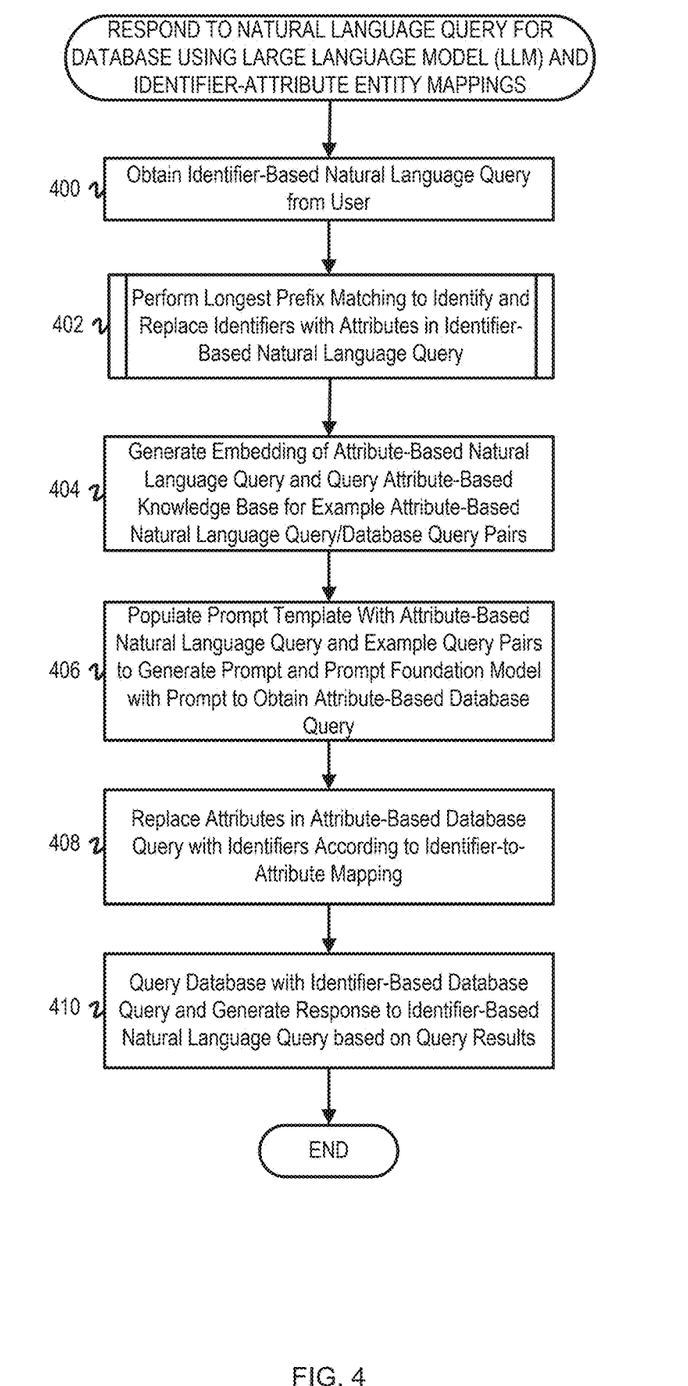
FIG. 4 is a flowchart of example operations for responding to natural language queries for data stored in a database using an LLM and identifier-attribute entity mappings.
Figure 5:
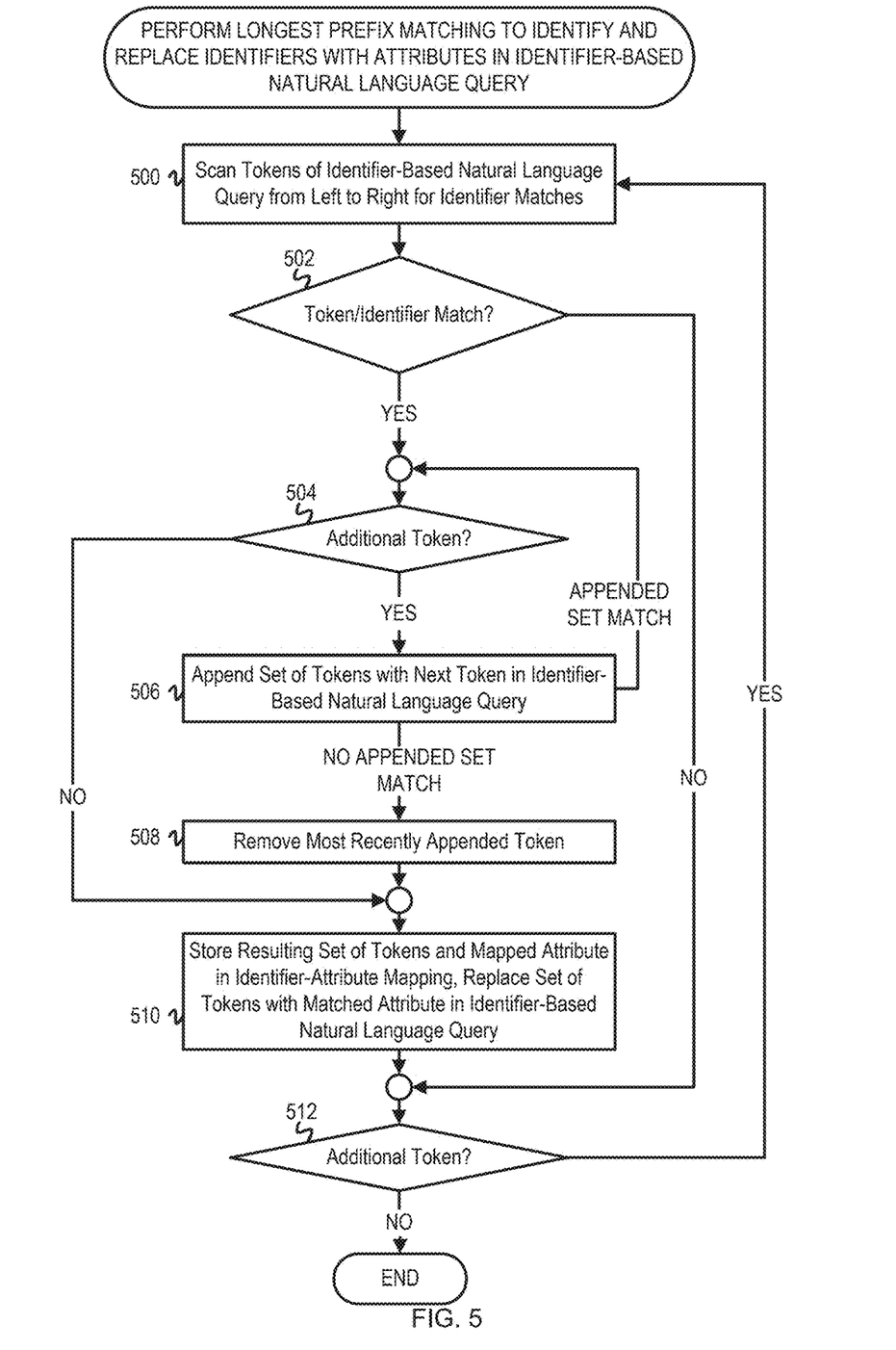
FIG. 5 is a flowchart of example operations for performing longest prefix matching to identify and replace identifiers with attributes in an identifier-based natural language query.
Figure 6:
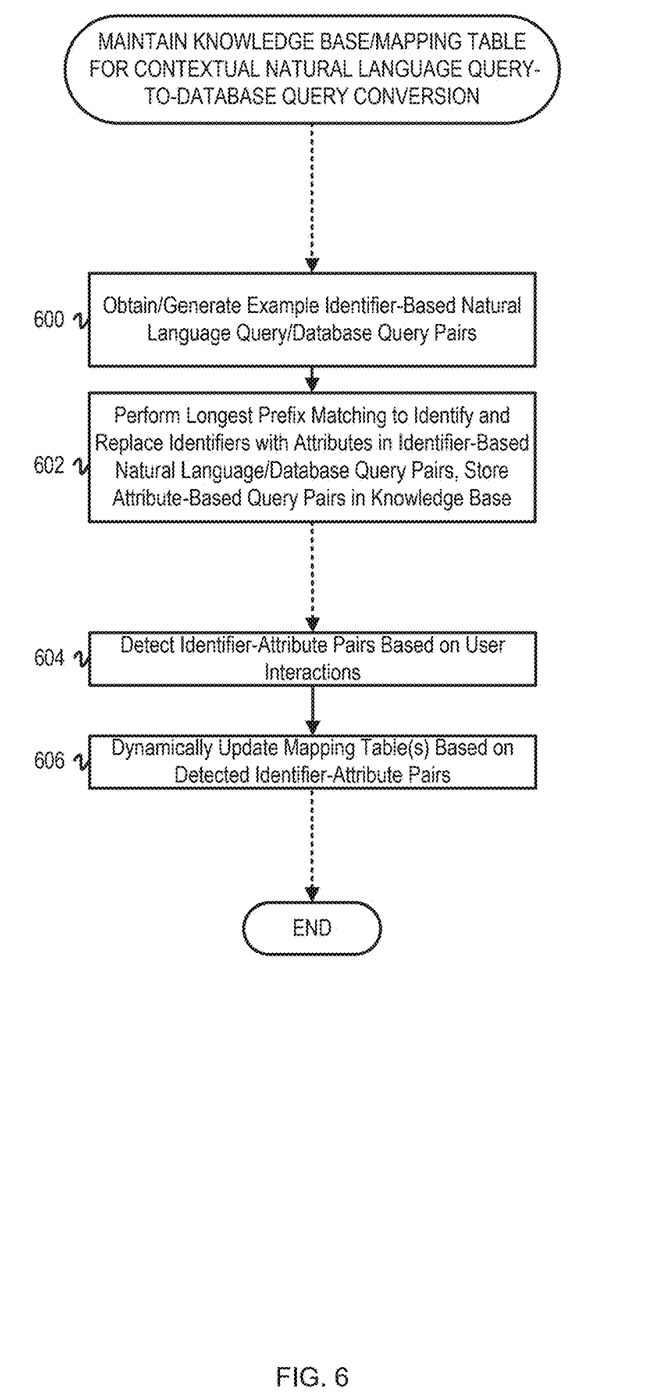
FIG. 6 is a flowchart of example operations for maintaining a knowledge base and a mapping table for contextual natural language query-to-database query conversion.

FIGS. 4-6 are flowcharts of example operations. The example operations are described with reference to a contextual natural language query response system (contextual system) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for responding to natural language queries for data stored in a database using an LLM and identifier-attribute entity mappings. At block 400, the contextual system obtains an identifier-based natural language query from a user. For instance, the user can be presented with a user interface at a corresponding endpoint device that includes a text box or other user interface element where the user can submit queries. In some embodiments, the contextual system can filter user queries to only include those queries that specifically relate to databases for which the contextual system is configured in subsequent operations.

At block 402, the contextual system performs longest prefix matching to identify (or extract) and replace identifiers with attributes in the identifier-based natural language query to generate an attribute-based natural language query. The identification and replacement of identifiers is according to mapping tables that associate identifiers with corresponding attributes within a context of entities for the identifiers. As a result of the replacement, the contextual system generates an identifier-attribute mapping that is stored for subsequent operations in FIG. 4. The operations at block 402 are described in greater detail in reference to FIG. 5.

At block 404, the contextual system generates an embedding of the attribute-based natural language query and queries an attribute-based knowledge base for example attribute-based natural language query/database query pairs. The example query pairs are subsequently used to augment prompts to a foundation model using RAG. The embedding comprises an NLP embedding (e.g., word2vec) that converts sets of tokens (i.e., attribute-based natural language queries) to numerical vectors while preserving semantic similarity between the sets of tokens. The attribute-based knowledge base can comprise a vector database or other database type configured for efficient retrieval and can be configured to return the top N (e.g., N=5) query pairs having most similar natural language query embeddings.

At block 406, the contextual system populates a prompt template with the attribute-based natural language query and the example query pairs retrieved from the attribute-based knowledge base to generate a prompt for a foundation model. The contextual system then prompts the foundation model with the prompt to obtain an attribute-based database query. The prompt template comprises instructions to generate a database query based on the attribute-based natural language query using the example query pairs as examples of inputs and corresponding outputs to guide the foundation model. The prompt template can further comprise a description of a schema for a query language and/or indication of the query language for the database to be queried by the resulting output database query, as well as instructions that the foundation model is an expert for the context of the entities corresponding to identifiers/attributes.

At block 408, the contextual system replaces attributes in the attribute-based database query with corresponding identifiers according to the identifier-attribute mapping stored at block 402. The contextual system can scan the attribute-based database query from left to right to detect matches with attributes in the identifier-attribute mapping and can replace those attributes with the corresponding identifiers according to the mapping.

At block 410, the contextual system queries the database with the identifier-based database query and generates a response to the identifier-based database query based on the query results. The contextual system can generate the response using a prompt template and/or can prompt a foundation model (that may be distinct from the foundation model used to generate the attribute-based database query) with the query results, the identifier-based natural language query, and instructions to respond to the identifier-based natural language query using the query results.

FIG. 5 is a flowchart of example operations for performing longest prefix matching to identify and replace identifiers with attributes in an identifier-based natural language query. At block 500, the contextual system scans tokens of the identifier-based natural language query from left to right for identifier matches. The matches may be full (i.e., a token comprises the entire identifier) or partial (i.e., a token is a prefix for a set of tokens of the entire identifier). Identifiers (including identifier prefixes) and corresponding attributes are stored in a mapping table, and the contextual system performs a lookup in the mapping table to see if during the scanning each token matches an identifier or identifier prefix. At block 502, if the contextual system determines that the token is a match to an identifier or an identifier prefix, operational flow proceeds to block 504. Otherwise, operational flow proceeds to block 512.

At block 504, the contextual system determines whether there is an additional token in the identifier-based natural language query subsequent to the most recently scanned token. If there is an additional token, operational flow proceeds to block 506. Otherwise, operational flow proceeds to block 510.

At block 506, the contextual system appends the next token in the identifier-based natural language query to the current set of tokens. The current set of tokens is initialized as the first matched token, and if there are existing tokens in the current set, the next token is appended to the current set of tokens to obtain an appended set of tokens. The contextual system then determines whether the appended set of tokens matches an identifier (or identifier prefix) according to the mapping table.

At block 507, the contextual system determines whether the appended set of tokens matches an identifier (or identifier prefix) stored in the mapping table. If the appended set of tokens matches an identifier or identifier prefix, operational flow returns to block 504. Otherwise, operational flow proceeds to block 508, and the contextual system removes the most recently added token from the appended set of tokens.

At block 510, the contextual system stores the resulting set of tokens and corresponding mapped attribute according to the identifier-attribute mapping table in an identifier-attribute mapping. The contextual system additionally replaces the set of tokens with the mapped attribute in the identifier-based natural language query.

At block 512, the contextual system determines whether there is an additional token in the identifier-based natural language query. If there is an additional token, operational flow returns to block 500 to continue scanning the identifier-based natural language query starting at the additional token. Otherwise, the operations in FIG. 5 are complete.

The algorithm depicted in FIG. 5 for matching identifiers and identifier prefixes in the identifier-based natural language query and replacing the matched identifiers/identifier prefixes with corresponding attributes according to the mapping table can have many alternative implementations. This example is provided to be illustrative and not limiting. Any algorithm that matches tokens and sets of tokens in the identifier-based natural language query with identifiers/longest identifier prefixes and then replaces the matched identifiers/longest identifier prefixes with corresponding attributes according to the mapping table can be implemented.

FIG. 6 is a flowchart of example operations for maintaining a knowledge base and a mapping table for contextual natural language query-to-database query conversion. The mapping table is used to replace identifiers with attributes in natural language queries, store the mapping from identifiers to attributes, then for use of the mapping to replace attributes with identifiers in resulting database queries, according to the foregoing description. The knowledge base is used to retrieve attribute-based natural language/database query pairs having natural language queries that are semantically similar to an attribute-based natural language query for RAG, also according to the foregoing operations. The operations for maintaining the knowledge base (blocks 600 and 602) and maintaining the mapping table (blocks 604 and 606) in FIG. 6 are separated by dashed lines to indicate that, even though both sets of operations are directed towards maintaining the contextual system, they can occur independently/asynchronously of one another.

At block 600, the contextual system (and/or a domain-level expert) obtains and/or generates example identifier-based natural language query/database query pairs. For instance, the contextual system (or other chatbot) can receive user queries, generate responses to those user queries, and receive feedback that those responses comprise the correct data that was queried by corresponding users. Additionally or alternatively, a domain-level expert can curate a set of example natural language query/database query pairs known to be correct.

At block 602, the contextual system performs longest prefix matching to identify and replace identifiers with attributes in the identifier-based natural language/database query pairs and stores the resulting attribute-based query pairs in the knowledge base. The longest prefix matching can be performed according to the operations described in reference to FIG. 5.

At block 604, the contextual system detects identifier-attribute pairs based on user interactions. For instance, one or more machine learning models can be trained to detect identifiers corresponding to entities and associate those identifiers with attributes (e.g., using named-entity recognition). For instance, an LLM can be used for zero-shot named entity recognition to detect identifiers in user queries and assign attributes (i.e., classifications/categories) to the identifiers.

At block 606, the contextual system dynamically updates the mapping table(s) based on the detected identifier-attribute pairs. The contextual system can maintain multiple mapping tables across multiple contexts, can merge or replace mapping tables, etc. The updating of the mapping table(s) is "dynamic" because it can be performed as the contextual system is responding to user queries, as soon as new identifier-attribute pairs are detected.

Variations

The foregoing describes using identifier-attribute mapping tables, attribute-based knowledge bases, and LLMs to respond to user queries for data stored in databases by prompting the LLM to generate database queries. The LLMs can respond to other types of user queries that are context-specific and wherein an LLM may misinterpret certain identifiers within that context. For instance, the LLM may be deployed in a cybersecurity context wherein firewalls have compound identifiers wherein prefixes of the identifiers have varying meanings such as firewall models, firewall serial numbers, etc.

An "attribute" as used herein can alternatively be referred to as a "classification", "class" or "category" of an entity, for instance classifications/classes/categories determined in the context of named-entity recognition.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 6 for maintaining knowledge bases and for maintaining mapping tables can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
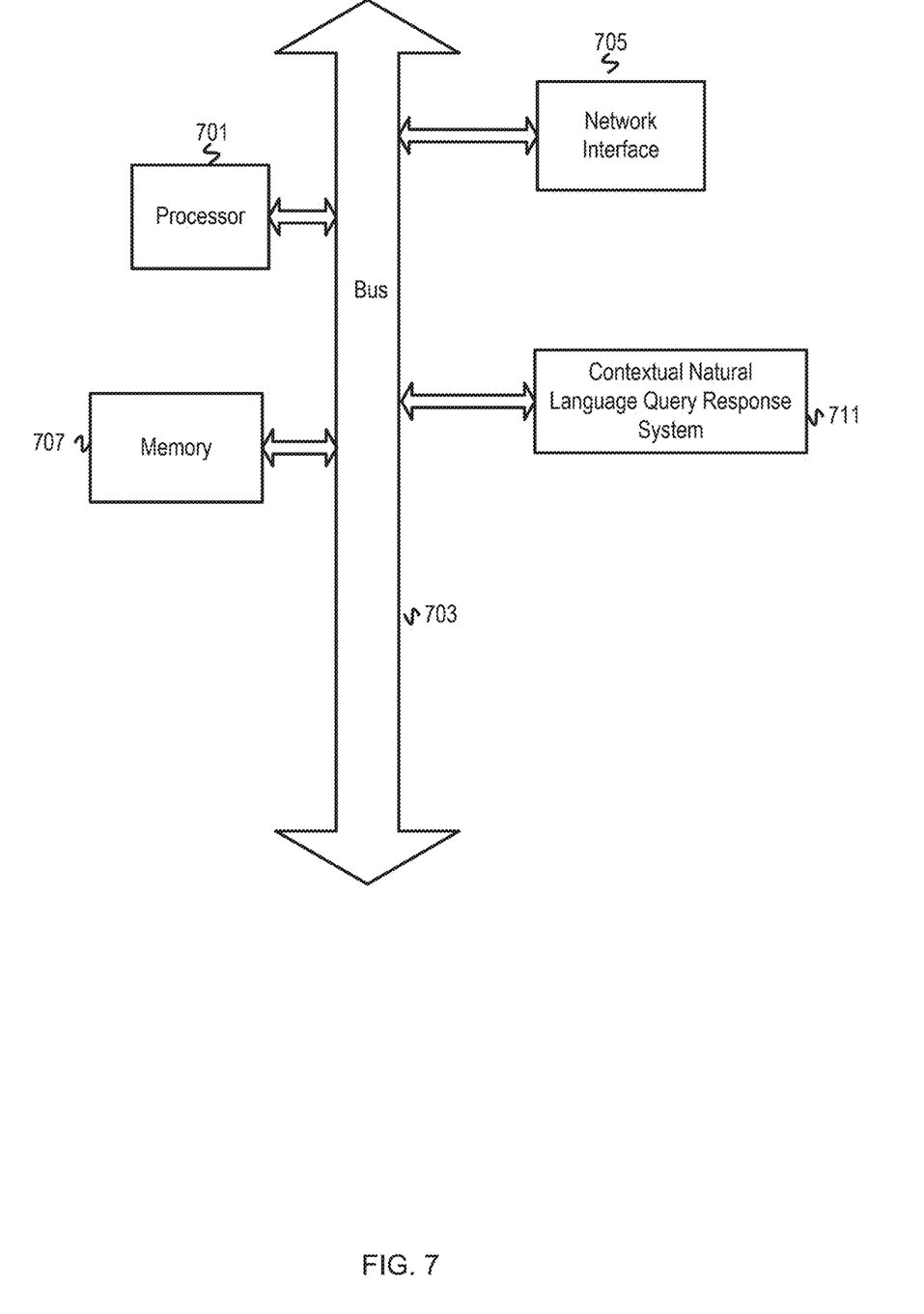
FIG. 7 depicts an example computer system with a contextual natural language query response system.

FIG. 7 depicts an example computer system with a contextual natural language query response system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a contextual natural language query response system (contextual system) 711. The contextual system 711. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    based on receiving a first natural language query for data in one or more databases related to a domain, identifying one or more identifiers of one or more entities in the first natural language query;
    determining a mapping between the one or more identifiers in the first natural language query and one or more entity attributes according to a mapping table between entity identifiers and entity attributes for the domain;

replacing, in the first natural language query, the one or more identifiers with mapped ones of the one or more entity attributes indicated in the mapping to obtain a second natural language query;

prompting a foundation model with a first prompt to obtain first one or more database queries for the one or more databases, wherein the first prompt comprises the second natural language query and task instructions to generate first one or more database queries for the one or more databases based on the second natural language query;

replacing those of the one or more entity attributes in the first one or more database queries with corresponding ones of the one or more identifiers according to the mapping to generate second one or more database queries; and querying the one or more databases with the second one or more database queries to obtain results based on which to generate a response to the first natural language query.

2. The method of claim 1 further comprising:

retrieving one or more examples from a knowledge base according to similarity with the second natural language query; and populating a prompt template with the one or more examples and the second natural language query to generate the first prompt.

3. The method of claim 2, wherein the one or more examples comprise example attribute-based natural language queries and corresponding example attribute-based database queries.

4. The method of claim 2, wherein retrieving the one or more examples from the knowledge base comprises:

generating an embedding of the second natural language query; and querying the knowledge base with the embedding.

5. The method of claim 2, further comprising populating the knowledge base with example attribute-based natural language queries and corresponding example attribute-based database queries, wherein populating the knowledge base comprises:

obtaining example identifier-based natural language queries and corresponding example identifier-based database queries; and replacing identifiers of entities with corresponding entity attributes in the example identifier-based natural language queries and the example identifier-based database queries according to the mapping table to obtain the example attribute-based natural language queries and the example attribute-based database queries.

6. The method of claim 2, wherein the prompt template comprises a description of one or more schemas for one or more query languages of the one or more databases and indications of which of the one or more query languages correspond to the one or more databases.

7. The method of claim 1, wherein the domain comprises Internet of Things devices, wherein the entity attributes comprise at least one of device categories, device vendors, and device models.

8. The method of claim 6, wherein the one or more query languages comprise the Structured Query Language.

9. The method of claim 1, wherein determining the mapping between the one or more identifiers in the first natural language query and one or more entity attributes, comprises, performing a longest prefix search in the first natural language query for at least one of identifiers and identifier prefixes stored in the mapping table to identify the one or more identifiers; and mapping the one or more identifiers to corresponding ones of the one or more entity attributes according to the mapping table to generate the mapping.

10. A non-transitory machine-readable medium having program code stored thereon, the program code comprising instructions to:

based on receiving a first natural language query for data in a database, extract one or more identifiers of one or more entities from the first natural language query;

determine a mapping between the one or more identifiers in the first natural language query and one or more entity attributes according to a mapping table between entity identifiers and entity attributes, wherein the mapping table is based on context of a domain related to the database;

replace, in the first natural language query, the one or more identifiers with mapped ones of the one or more entity attributes indicated in the mapping to obtain a second natural language query;

prompt a foundation model with a first prompt to obtain a first database query for the database, wherein the first prompt comprises the second natural language query and task instructions to generate first database query for the database based on the second natural language query;

replace those of the one or more entity attributes in the first database query with corresponding ones of the one or more identifiers according to the mapping to generate a second database query; and query the database with the second database query to obtain results based on which to generate a response to the first natural language query.

11. The machine-readable media of claim 10, wherein the program code further comprises instructions to:

retrieve one or more examples from a knowledge base according to similarity with the second natural language query; and populate a prompt template with the one or more examples and the second natural language query to generate the first prompt.

12. The machine-readable media of claim 11, wherein the one or more examples comprise example attribute-based natural language queries and corresponding example attribute-based database queries.

13. The machine-readable media of claim 11, wherein the instructions to retrieve the one or more examples from the knowledge base comprise instructions to:

generate an embedding of the second natural language query; and query the knowledge base with the embedding.

14. The machine-readable media of claim 12, wherein the program code further comprises instructions to populate the knowledge base with example attribute-based natural language queries and corresponding example attribute-based database queries, wherein the instructions to populate the knowledge base comprise instructions to:

obtain example identifier-based natural language queries and corresponding example identifier-based database queries; and replace identifiers of entities with corresponding entity attributes in the example identifier-based natural language queries and the example identifier-based database queries according to the mapping table to obtain the example attribute-based database queries and the example attribute-based database queries.

15. The machine-readable media of claim 12, wherein the prompt template comprises a description of one or more schemas for a query language of the database.

16. An apparatus comprising:
a processor; and
a machine-readable medium having instructions stored thereon that are executable by the processor to cause the apparatus to,
scan a first natural language query to identify and replace one or more identifiers of one or more entities with corresponding one or more attributes of the one or more entities in the first natural language query to generate a second natural language query, wherein the first natural language query is for data in a database related to a domain, wherein the instructions to identify and replace the one or more identifiers with the corresponding one or more attributes comprise instructions executable by the processor to cause the apparatus to map the one or more identifiers to the one or more attributes according to a mapping in a mapping table between entity identifiers and entity attributes for the domain;
prompt a foundation model with a first prompt to obtain a first database query for the database, wherein the first prompt comprises the second natural language query and task instructions to generate a first database query for the database based on the second natural language query;
replace those of the one or more attributes in the first database query with corresponding ones of the one or more identifiers according to the mapping to generate a second database query; and
query the database with the second database query to obtain results based on which to generate a response to the first natural language query.

17. The apparatus of claim 16, wherein the machine-readable medium further has stored thereon instructions executable by the processor to cause the apparatus to:
retrieve one or more examples from a knowledge base according to similarity with the second natural language query; and
populate a prompt template with the one or more examples and the second natural language query to generate the first prompt.

18. The apparatus of claim 17, wherein the one or more examples comprise example attribute-based natural language queries and corresponding example attribute-based database queries.

19. The apparatus of claim 17, wherein the instructions to retrieve the one or more examples from the knowledge base comprise instructions executable by the processor to cause the apparatus to:
generate an embedding of the second natural language query; and
query the knowledge base with the embedding.

20. The apparatus of claim 17, wherein the machine-readable medium further has stored thereon instructions executable by the processor to cause the apparatus to populate the knowledge base with example attribute-based natural language queries and corresponding example attribute-based database queries, wherein the instructions to populate the knowledge base comprise instructions executable by the processor to cause the apparatus to:
obtain example identifier-based natural language queries and corresponding example identifier-based database queries; and
replace identifiers of entities with corresponding entity attributes in the example identifier-based natural language queries and the example identifier-based database queries according to the mapping table to obtain the example attribute-based natural language queries and the example attribute-based database queries.

* * * * *